US006358603B1

(12) United States Patent
Bache

(10) Patent No.: US 6,358,603 B1
(45) Date of Patent: Mar. 19, 2002

(54) HARD IMPACT RESISTANT COMPOSITE

(75) Inventor: Hans Henrik Bache, Hjallerup (DK)

(73) Assignee: Aalborg Portland A/S, Aalborg (DK)

( * ) Notice: Subject to any disclaimer, the term of this patent is extended or adjusted under 35 U.S.C. 154(b) by 0 days.

(21) Appl. No.: 09/341,562

(22) PCT Filed: Jan. 13, 1998

(86) PCT No.: PCT/DK98/00017

§ 371 Date: Aug. 19, 1999

§ 102(e) Date: Aug. 19, 1999

(87) PCT Pub. No.: WO98/30769

PCT Pub. Date: Jul. 16, 1998

(51) Int. Cl.$^7$ .............................. E04H 12/12; B32B 5/16
(52) U.S. Cl. ...................... 428/323; 52/638; 52/648.1; 52/649.1; 52/649.8
(58) Field of Search ................... 428/323, 99; 52/654, 52/648.1, 649.1, 649.8, 638

(56) References Cited

U.S. PATENT DOCUMENTS

| 1,874,506 A | | 8/1932 | Greulich |
| 3,634,913 A | * | 1/1972 | Ausnit ........................ 24/201 |
| 3,877,523 A | * | 4/1975 | Ely ............................. 403/202 |
| 3,980,279 A | * | 9/1976 | Bofinger ..................... 256/13.1 |
| 4,079,497 A | | 3/1978 | Jernigan |
| 4,592,678 A | * | 6/1986 | McNinch et al. ........... 405/284 |
| 5,016,417 A | * | 5/1991 | Mentken ..................... 52/571 |
| 5,967,841 A | * | 10/1999 | Bianca et al. .............. 439/590 |

FOREIGN PATENT DOCUMENTS

| EP | 0-010777 | 11/1979 |
| EP | 0-042935 | 5/1981 |
| FR | 2-280780 | 2/1976 |
| GB | 116702 | 12/1918 |
| GB | 2-262950 | 7/1993 |
| WO | 87/07597 | 12/1987 |

OTHER PUBLICATIONS

Kiger et al. Role of Shear Reinforcement in Large—Deflection Behavior, Nov.–Dec. 1989, pp. 664–671.
Bache, Ny Beton—Ny Teknologi, Apr. 4, 1992, pp. 1–38.

* cited by examiner

*Primary Examiner*—Hoa T. Le
(74) *Attorney, Agent, or Firm*—Merchant & Gould P.C.

(57) ABSTRACT

A shaped article, at least one domain of which has a three-dimensionally reinforced composite structure comprising of a matrix and a reinforcing system (2, 4, 5, 6), the reinforcing system comprising bodies such as bars, wires, cables, or plates embedded in the matrix and extending three-dimensionally in first (4, 5) second (2) and third (6) dimensions therein, the reinforcing system being tension interlocked in at least one dimension in that reinforcement components extending in the first and/or second dimension are tension interlocked to reinforcement components extending in the same dimension(s), but at a transverse distance therefrom, by transverse reinforcement components extending in a dimension transverse, to a plane or surface defined by the reinforcement in the first and/or second dimension. The matrix is preferably a dense cement-based matrix prepared from cement, microsilica, a concrete superplasticiser and water, or a metallic matrix. The shaped articles are capable of absorbing high energy with retention of a substantial degree of internal coherence, e.g. under exposure to high velocity impact.

30 Claims, 11 Drawing Sheets

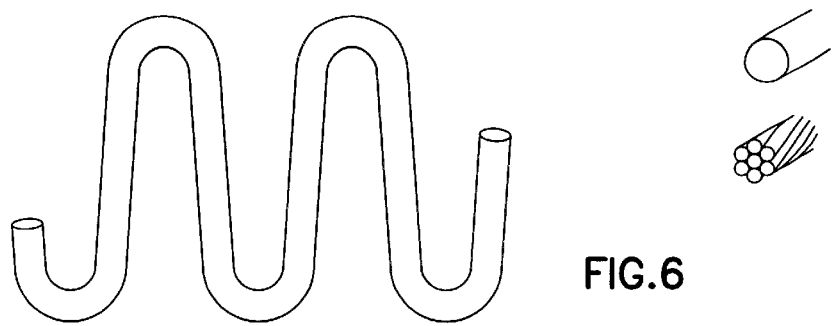
FIG.6
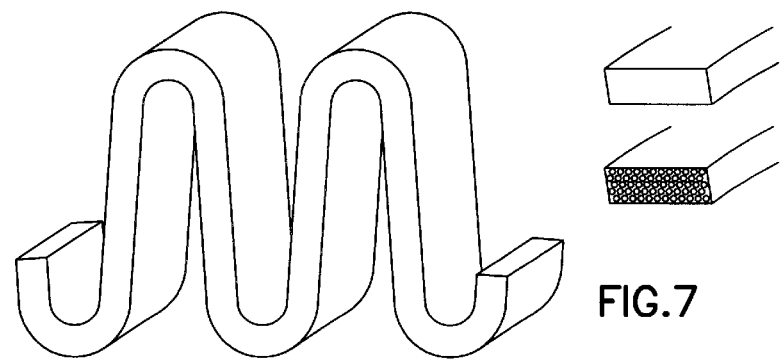
FIG.7
FIG.8
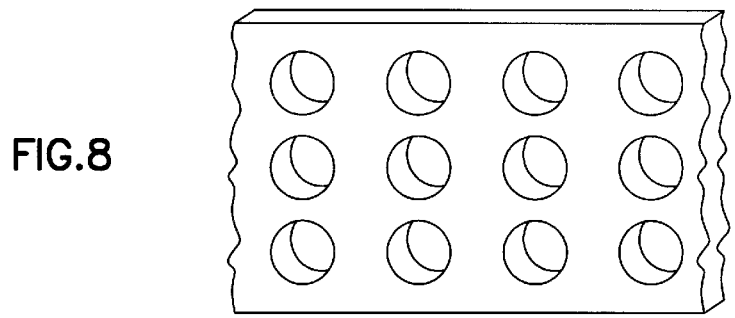
FIG.9
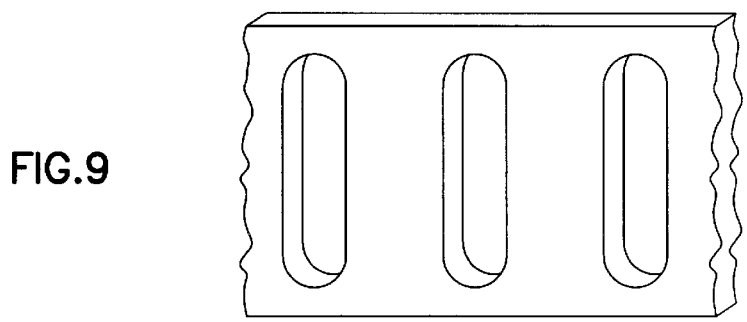

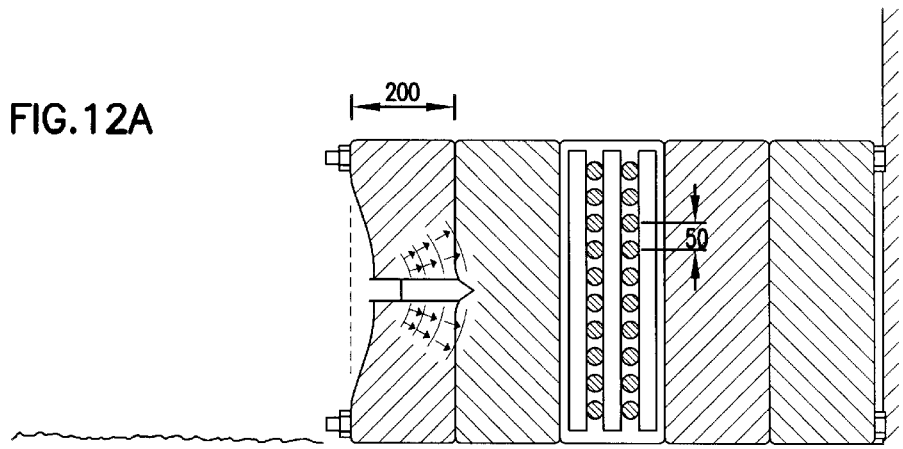
FIG.12A
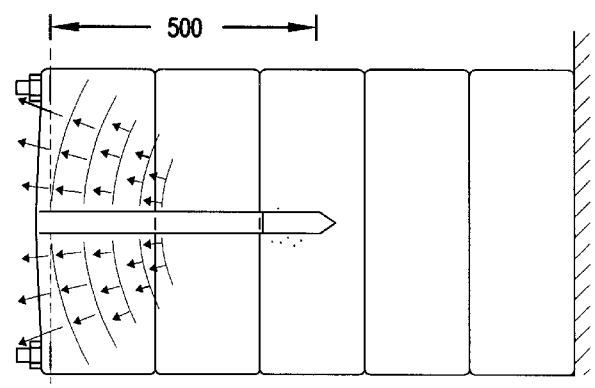
FIG.12B
FIG.12C
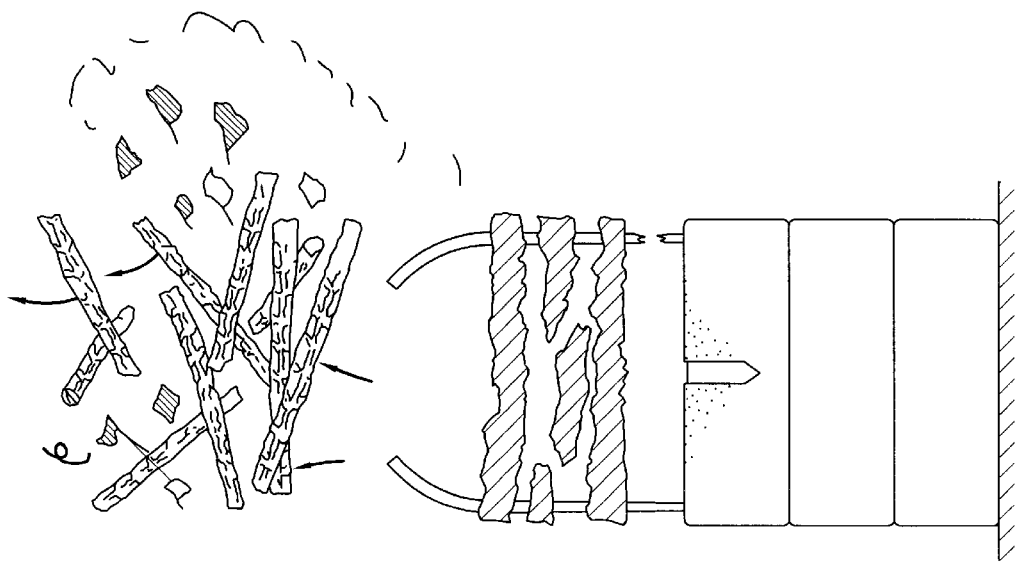

HARD IMPACT RESISTANT COMPOSITE

FIELD OF THE INVENTION

The present invention relates to a shaped article which is capable of resisting impact, including high velocity impact and other high energy impact.

A number of impact challenges, such as attacks with projectiles, shells, grenades, missiles and bombs, have as their main purpose to penetrate and/or damage the objects which they are aimed at. Another class of potentially damaging impact is accidental events such as gas explosions, vehicle (ships, aeroplanes, cars, etc.) collision, impact occurring during earthquakes, and the accidental dropping of articles, e.g. in the offshore industry.

Another type of impact is impact processing, such as impact hammering, explosion shaping, etc. Another type of impact occurs in connection with quarrying of stone. For example, large pieces of stone may fall onto trucks or other machinery, and high energy impacts of this type can cause extensive damage.

Impact challenges also occur in the form of high energy impact from e.g. explosives. For example, bank vaults must be able to withstand an explosive impact of this type.

In high velocity or high energy impact, the behaviour of materials is in many ways fundamentally different from the behaviour under slow static influences—often resulting, inter alia, in fatal failure or destruction of the articles in question, even where the articles have very high load bearing capacity under static conditions.

For protection against damaging impact and for tools used for impacting processing, articles having better resistance against impact than hitherto obtainable are desired.

The present invention provides such articles. The articles of the invention can be designed to provide protection or resistance under influences where known art materials would fail or would be vastly inferior, in particular high energy impact such as high velocity impact.

DISCUSSION OF THE PRIOR ART

It is known to produce various high-strength composite materials, for example construction materials based e.g. on a matrix of Portland cement and very small particles such as ultrafine silica, and with reinforcement incorporated therein in the form of e.g. fibres, steel bars or wires, etc.

EP 010777 discloses very strong and dense composite cement-based composite materials prepared from Portland cement, inorganic solid silica dust particles, fibres, a concrete superplasticizer and water, the composite materials having a large content of silica dust particles and superplasticizer and a small water content, e.g. typically 10–30% by volume of silica dust particles based on the volume of the cement and silica dust, 1–4% by weight of superplasticizer dry matter based on the weight of the cement and silica dust, and a water/powder weight ratio of 0.12–0.30 based on the weight of the cement, silica dust and possible other fine powder present.

EP 042935 discloses improved composite materials based on the matrix of EP 010777 and additionally containing a strong aggregate with a strength exceeding that of ordinary sand or stone used as aggregate for ordinary concrete.

WO 87/07597 discloses a compact reinforced composite (CRC) material based on a combination of a rigid, dense and strong matrix comprising a base matrix corresponding to the composite materials described in EP 010777 and EP 042935 which is reinforced with a high content of relatively fine fibres and which is further reinforced with a high content of main reinforcement, e.g. in the form of steel bars, wires or cables, to result in a novel composite material which is both strong and rigid as well as ductile.

A technical paper ("Role of shear reinforcement in large-deflection behavior", Kiger et al., *ACI Structural Journal*, November–December 1989) describes the use of "lacing" or "single-leg stirrups" in order to tie the two principal reinforcement mats together in reinforced concrete structures designed for blast-resistance. The paper concludes that requirements for shear reinforcement such as lacing may be more restrictive and expensive than necessary, and it is stated that although transverse shear reinforcement (in the form of lacing or stirrups) can provide additional confinement for reinforced concrete beams, it provides very little, if any, additional confinement for slabs. It is furthermore suggested that the use of smaller but more numerous principal reinforcing bars may be a more effective way of preventing breakup of a concrete slab than the use of such transverse shear reinforcement. The emphasis of the paper is on the reinforcement itself, and there is no suggestion to use e.g. lacing with any particular type of concrete matrix.

Although the principle of "lacing" of reinforcing bars in a concrete structure designed for blast-resistance, e.g. as described in the technical paper referred to above, was known, the prior art contains no suggestion to combine this or a similar principle of reinforcement together with any particular type of concrete matrix. On the contrary, the cited technical paper suggests that an increased amount of main reinforcing bars might be a more effective solution to the problem of blast-resistance than the use of transverse reinforcement such as lacing. Thus, the problem of providing structures, in particular cement-based structures, with improved blast- or impact-resistance remains unsolved.

The CRC concept described in the above-cited WO 87/07597, on the other hand, emphasises both the nature of the matrix (a rigid, dense and strong cement-based matrix) and the reinforcement (a high content of reinforcing fibres together with a high content of main reinforcement in the form of e.g. steel bars, wires or cables). However, the concept of a 3-dimensional arrangement of main reinforcement, wherein individual reinforcing elements are interlocked with each other in at least one dimension, is in no way suggested by WO 87/07597, for the simple reason that such an intricate arrangement of reinforcement would have been regarded by a person skilled in the art as involving an unnecessary expense and difficulty without any expectation of technical benefit.

BRIEF DISCUSSION OF THE INVENTION

It is an object of the present invention to provide novel shaped articles with improved performance characteristics, in particular under dynamic conditions. One aspect of the present invention represents a further development of the CRC concept mentioned above, enabling the production of materials that are extremely strong and durable under both static and dynamic conditions, and which also show extremely high impact resistance.

The present invention relates in general to impact-resistant articles which are based on a combination of a hard, but fracture-ductile matrix and a three-dimensional reinforcement which is internally tension interlocked in at least one dimension. Articles according to the invention are unique in showing high strength, rigidity and ductility in all three directions and showing, upon being subjected to a large load, high strength, toughness and rigidity, as well as the capability of absorbing high energy with retention of a substantial degree of internal coherence, also under exposure to high-velocity or high-energy impact.

In its broadest aspect, the invention can be characterized as a shaped article, at least one domain of which has a three-dimensionally reinforced composite structure, the composite structure comprising a matrix and a reinforcing system, the reinforcing system comprising a plurality of bodies embedded in the matrix and extending three-dimensionally in first, second and third dimensions therein, the reinforcing system being tension interlocked in at least one dimension in that reinforcement components extending in the first and/or second dimension are tension interlocked to reinforcement components extending in the same dimension(s), but at a transverse distance therefrom, by transverse reinforcement components extending in a dimension transverse to a plane or surface defined by the reinforcement in the first and/or second dimension, the matrix having a compressive strength of at least 80 MPa, a modulus of elasticity of at least 40 GPa, and a fracture energy of at least 0.5 kN/m, the reinforcing bodies having a tensile strength of at least 200 MPa, preferably at least 400 Mpa.

DETAILED DESCRIPTION OF THE INVENTION

As indicated above, the present invention relates in particular to shaped articles that exhibit improved performance under dynamic conditions. Therefore, in a preferred embodiment of the shaped articles of the invention, the volume proportion of the reinforcing bodies in the reinforced composite structure is at least 2%, the volume proportion in any specific direction being at least 0.5%. Preferably, the volume proportion of the reinforcing bodies is at least 4% and the volume proportion in any specific direction is at least 0.75%, and more preferably the volume proportion of the reinforcing bodies is at least 6% and the volume proportion in any specific direction is at least 1%.

The number of reinforcing components in the reinforced composite structure domain will typically be at least 3, preferably at least 5, in any of the first, second and third dimensions of an arbitrary rectangular reference coordinate system in the reinforced 5 composite domain.

It is also preferred that the ultimate strain of the reinforcing bodies is at least 2%. However, when the reinforcing bodies have a tensile strength between 200 and 300 MPa then the ultimate strain 10 should be at least 20%, and when the reinforcing bodies have a tensile strength between 301 and 400 MPa, then the ultimate strain should be at least 15%.

The reinforcement systems in the articles according to the invention may be configured in many different ways, such as will be explained in the following, but characteristic to them all is a three-dimensional grid, network or lattice of reinforcement (which may have many different configurations as explained in the following) in which matrix material as a "continuous phase" is dispersed in the interstices of the "lattice", which also normally and preferably constitutes "a continuous phase". Characteristic to the present invention is the fact that the reinforcement system comprises components which extend in all three dimensions, and that the concentration of reinforcement in any particular direction is above the above-stated minimum value.

It is also an essential feature of the invention that in at least one direction, the reinforcement system is internally "tension interlocked", which means that at least in that direction, the reinforcement system counteracts separation in that direction. The term "tension interlocked" does not necessarily mean that the reinforcement in question is under tension under static conditions, but rather that when the material is exposed to tension forces that tend to separate the interlocked components of the reinforcement in question from each other, the tension interlocking provided by the transverse reinforcement components resists the separation, even under conditions of heavy destruction where matrix might fail. This is explained in greater detail in connection with the drawings.

This feature plays an essential role in the high velocity impact resistance achieved by the present invention: Take as an example (with reference to FIG. 11, which is discussed in greater detail below) a large 20 cm thick panel or plate with 20% by volume of reinforcement in the plane of the panel consisting of five layers of heavy steel bars arranged perpendicular to each other and interconnected by means of 3.1% by volume of transverse reinforcement fixing each individual steel bar in the top layer with a corresponding individual steel bar in the bottom layer. This reinforcement is embedded in and tightly fixed to a strong, stiff and fracture-ductile cement-based matrix. Such panels stopped a 47 kg armour-piercing shell (diameter 152 mm) travelling at 482 m/sec, the shell ending tightly fixed in the panels with 8 cm of its rear still extending from the front of the plate!—and with very little damage of the panel except in the immediate vicinity of the shell and fine map cracking of the plate surface. In the same series of experiments, plates of the same size of high quality cement-based composite and subjected to the same load were completely crushed into small pieces. In similar experiments, strong plates with matrix materials substantially identical to the above materials and strongly reinforced with reinforcement identical to the above reinforcement, but without the essential transverse reinforcement, large damage occurred. The two front plates (thickness of each plate 20 cm) were completely shattered, with materials including 20 mm steel bars 60 meters being flung backwards by the reflected wave. Such a large destruction is completely avoided with the articles of the invention.

It will be understood that the shaped article does not necessarily have the reinforced composite structure throughout the article, but that one or several domains which fulfil the criteria stated above may be present together with domains which do not conform to the criteria. As an example may be mentioned a bank vault where a domain having the defined reinforced composite structure is hidden within a wall which has a different exterior.

The reinforcing system (the "main reinforcement") will typically be made from bars, e.g. several layers of bars, with bars within a layer being arranged parallel to each other, the direction of the bars in one layer typically being perpendicular to the bars in the adjacent layer or layers. It is also possible to have layers of the reinforcement consisting of perforated plates, possibly with other layers being, e.g., bars or rods. The transverse components may be bars or rods bent around the outer layers of the main reinforcement, or other configurations, such as illustrated in the drawings. It is also possible for the transverse components to be integrated parts of one reinforcement body, e.g. where the reinforcement body consists of several perforated plates at a (transverse) distance from each other joined together with transverse rods welded to the plates in such a manner that they give a strong tension interlocking.

It should be noted that several "reinforcing components" in a given dimension may be a part of a single reinforcing body. Thus, a reference herein to a number of reinforcing components in a given dimension need not be equivalent to the same number of independent (i.e. non-connected) reinforcing bodies. See e.g. FIG. 10 and the accompanying description below for an illustration of this principle.

In the preferred embodiments, the transverse reinforcement components tension interlock reinforcement components of opposite outermost planes or surfaces of the reinforcement, so that the reinforcement system as a whole resists separation in the transverse direction.

As indicated above, the reinforcing system may be tension interlocked in more than one dimension. This may be done according to the same principles described above, using e.g. rods bent around rods perpendicular thereto, or wires/cables. Another interesting possibility is to have adjacent longitudinal rods combined in a hairpin-like configuration around and enclosing the outer layers of rods perpendicular thereto. While this is not tension interlocking proper, it is an interesting further enhancement of the reinforcing system where a transverse tension interlocking is already present.

The matrix material is relatively strong, stiff and resistant to fracturing, such as appears from the above minimum criteria. Preferably, the matrix material has a compressive strength of at least 100 MPa, preferably at least 150 MPa, more preferably at least 200 MPa, more preferably at least 250 MPa and most preferably at least 300 MPa. The modulus of elasticity of the matrix material is preferably at least 60 GPa, more preferably at least 80 GPa, and still more preferably at least 100 GPa. The fracture energy of the matrix material is in particular at least 1 kN/m, preferably at least 2 kN/m, more preferably at least 5 kN/m, more preferably at least 10 kN/m, more preferably at least 20 kN/m, and more preferably at least 30 kN/m.

As appears from the above, the reinforcing bodies combined with the strong, stiff and fracture-resistant matrix are characterized by a combination of a high tensile strength and sufficiently high ultimate strain, and are present in a high volume in the matrix in any particular direction of the matrix, which means that in any cross section layer in any direction taken within the matrix domain, the volume concentration fulfils the criteria stated. It is most advantageous that the strength and strain parameters are higher than the minimum stated above. Thus, it is preferred that the reinforcing bodies have a tensile strength of at least 700 MPa, preferably at least 1000 MPa, more preferably at least 1500 MPa, more preferably at least 2000 MPa, more preferably at least 2500 MPa, and more preferably at least 3000 MPa. The ultimate strain of the reinforcing body or bodies is preferably at least 4%, more preferably at least 6%, more preferably at least 10%, more preferably at least 15%, more preferably at least 20%, and more preferably at least 30%. These strong reinforcing bodies or components are preferably present in a high volume concentration in the reinforced composite structure domain, e.g. typically at least 6% by volume as mentioned above, with a genuine three-dimensionality expressed by a volume concentration of at least 1% in any specific direction of the domain. In a further preferred embodiment, the volume proportion of the reinforcing bodies in the domain which has the reinforced composite structure is at least 8%, preferably at least 10%, such as at least 15%, e.g. at least 20%, such as at least 25%, e.g. at least 30%, and the volume proportion of the reinforcing body or bodies in any specific direction of the domain is at least 2%, e.g. at least 5%, e.g. at least 10%, such as at least 15%. The volume concentration of the reinforcement should, of course, not be concentrated in a single reinforcement component. In a preferred embodiment, the number of reinforcing body components in the reinforced composite structure domain is at least 8, such as at least 15, e.g. at least 20, in any of the first, second and third dimensions of an arbitrary rectangular reference coordinate system in the reinforced composite domain.

The matrix material of the shaped articles of the invention may be prepared by methods known as such in the art; for some of the matrix materials, more detailed descriptions of their preparation are given herein. Important examples of matrices which are useful for the purpose of the invention are matrices comprising particles and fibres held together by a binder, in particular ceramics-based materials, cement-based materials, plastics-based and glass-based materials. Particularly interesting materials are metal-based materials and cement-based materials. The latter types of materials comprise the materials disclosed in the above-mentioned patent references.

For a matrix comprising matrix particles and fibres held together by a binder, e.g. a cement-based binder, the content of matrix particles and fibres in the matrix should be at least 50% by volume, e.g. at least 60% by volume, e.g. at least 70% by volume, e.g. at least 80% by volume, such as at least 85% or 90% by volume, and the content of fibres in the matrix should be at least 1% by volume, e.g. at least 2% by volume, e.g. at least 3% by volume, such as at least 5% or 10% by volume.

In a particular embodiment, when the matrix is prepared from a submatrix comprising fine particles having a size of 0.5–100 mm (e.g. cement particles), ultrafine particles having a size of from 50 Å to less than 0.5 $\mu$m (e.g. microsilica particles), a dispersing agent (e.g. a concrete superplasticizer) and water, the content of fine particles and ultrafine particles in the submatrix should be at least 50% by volume, e.g. at least 60% by volume, e.g. at least 65% by volume, e.g. at least 70% by volume, such as at least 75% or 80% by volume, and the content of matrix particles and fibres in the matrix should be at least 30% by volume, e.g. at least 40% by volume, e.g. at least 50% by volume, e.g. at least 55% by volume, e.g. at least 60% by volume, e.g. at least 65% by volume, such as at least 70% or 75% by volume.

The combination of the matrix material with the main reinforcement should be performed under conditions which ensure maximum density and homogeneity of the matrix material tightly fixed to the reinforcement. Typically, the matrix material is introduced by casting in a mould in which the reinforcing system has been pre-arranged, the homogeneous distribution of the matrix material in all interstices in the reinforcement and in excellent contact with the reinforcement preferably being aided by vibration or combined vibration and pressure, such as described in the above-mentioned WO 87/07597.

Articles according to the present invention can be made in sizes from small articles such as machine parts through sizes of the order of a meter or meters length and breadth up to even very large sizes with very thick walls of more than 30 cm, such as more than 50 cm or at least 75 cm or at least one meter or even more. Such very large, thick-walled structures are suitable, e.g., for encapsulation of nuclear power stations.

Although the present description and drawings refer for the sake of simplicity to structures in which the reinforcement is found in planes which are substhantially perpendicular to each other, it will be clear that the dimensions or planes defined by the reinforcement can be at various angles in relation to each other. Similarly, reinforcement in the form of e.g. bars within a plane or layer is not necessarily aligned parallel to each other, but can be arranged as desired, as long as the basic three-dimensional reinforcing structure of the invention, including the tension interlocking transverse rearrangement, is obtained. It should also be noted that the term "plane" as used in the present context should be understood to also refer to e.g. a curved surface. Thus, the "planes" of articles according to the invention may e.g. be the structure defined by inner and outer curves of an object with a semi-circular or other cross section which is not strictly "planar" in the geometric sense of the word.

The shaped articles of the present invention are typically in the form of e.g. plates, sheets, walls or portions thereof, etc., the surfaces of which can, as indicated above, be planar or irregular, e.g. curved or angled in one or more dimensions. In such articles, the main reinforcement will typically follow substantially, i.e. more or less parallel with, the surfaces, while the transverse reinforcement typically will extend more or less perpendicular to the surfaces.

BRIEF DESCRIPTION OF THE DRAWINGS

FIGS. 6 and 7 show side views and cross sectional views of different types of transverse reinforcement.

FIGS. 8 and 9 show examples of perforated plates for use as transverse reinforcement.

FIGS. 12a, 12b and 12c show views from the side illustrating successively the high velocity impact of a projectile in a reinforced prior art material.

The following drawings illustrate examples of how the reinforcement may be arranged in different embodiments of the invention.

Figure 1:
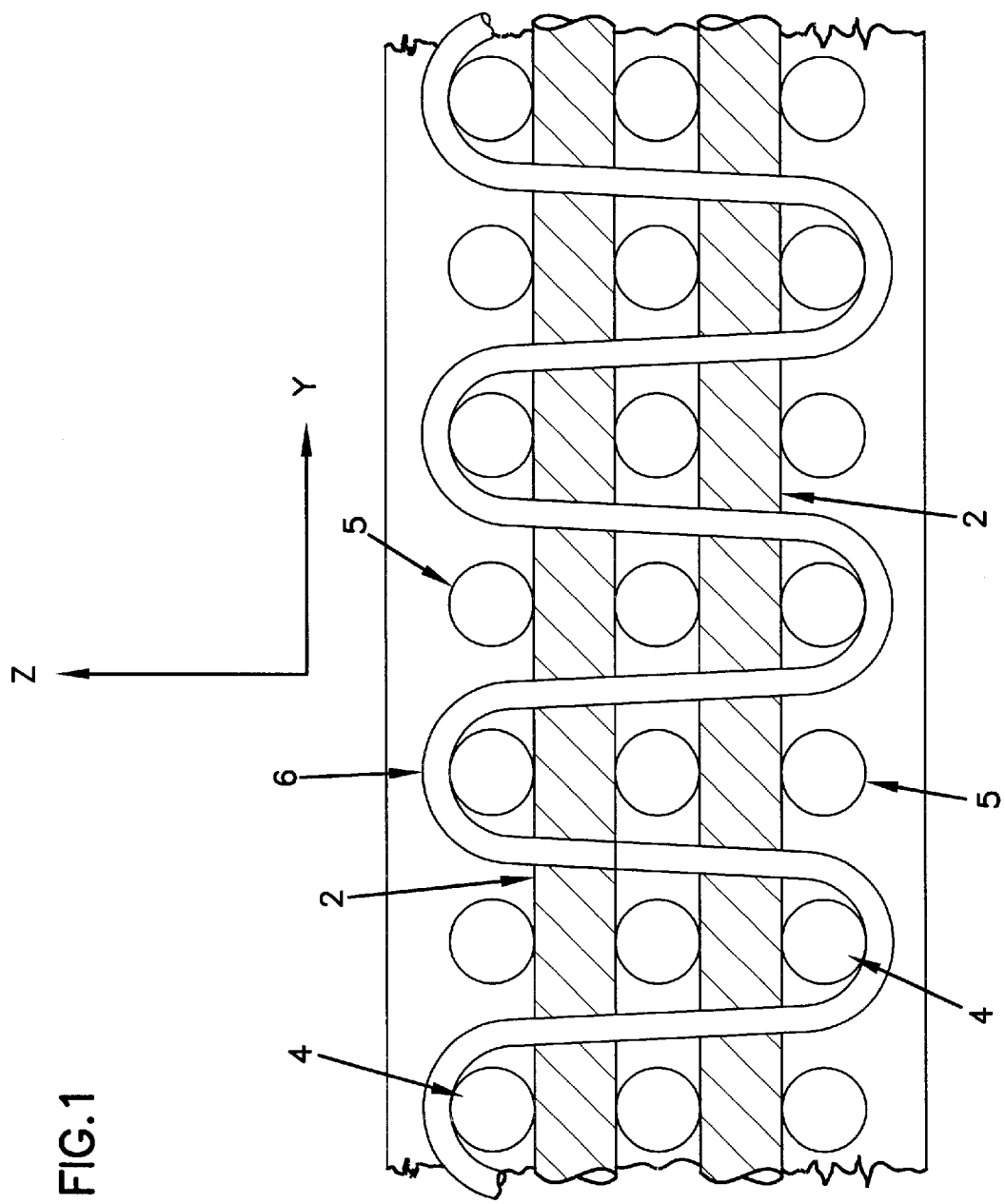
FIG. 1 shows a cross section from the side of a composite article according to the invention.

FIG. 1 shows an article according to the invention with main reinforcement comprising three layers of reinforcing bars 4, 5 extending in a first dimension X (perpendicular to the plane of the paper) and two layers of reinforcing bars 2 extending in a second dimension Y. Reinforcing bars 4 in the two outer layers of bars in the X dimension are tension interlocked by means of transverse reinforcing bars 6 which extend in a third dimension Z substantially perpendicular to the planes defined by the reinforcing bars 2 and the reinforcing bars 4, 5, respectively, and which wind around reinforcing bars 4 in the upper and lower layers.

The article shown in FIG. 1 can e.g. have a total thickness of 200 mm, reinforced with main reinforcing bars 2, 4, 5 of deformed steel 25 mm in diameter and with a transverse reinforcing bar 6 located at 100 mm intervals in the X dimension to tension interlock reinforcing bars 4. The reinforcement structure may in addition comprise further reinforcing bars (not shown) between the reinforcing bars 6 but offset 50 mm in the Y dimension, thereby providing tension interlocking of those reinforcing bars 5 which are not shown in this figure as being interlocked with the transverse reinforcing bars 6.

Figure 2:
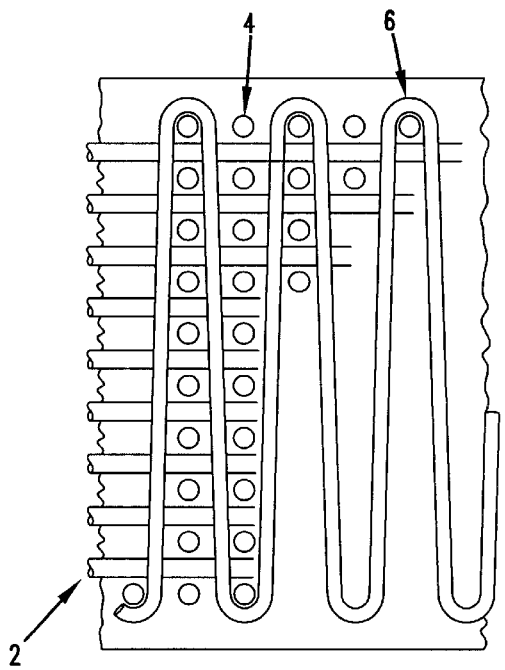
FIGS. 2 and 3 show cross sections from the side of alternative reinforcement structures in articles of the invention.

FIG. 2 shows another reinforcing structure similar to that shown in FIG. 1, although in FIG. 2 the structure contains multiple layers of reinforcing bars 2 extending in the first dimension and multiple layers of reinforcing bars 4 extending in the second dimension, with transverse reinforcing bars 6 extending in the third dimension and winding around the outer layers of reinforcing bars 4 to provide tension interlocking of the reinforcing structure.

Figure 3:
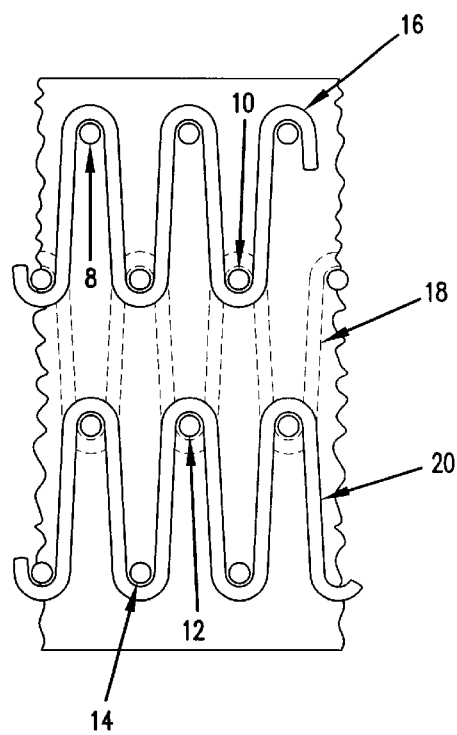

FIG. 3 shows another reinforcing structure with multiple layers of reinforcing bars extending in a first dimension (not shown) and multiple layers of reinforcing bars extending in a second dimension (8, 10, 12, 14; other layers not shown). In this structure, the transverse reinforcement consists of 3 different layers of transverse reinforcing bars which together cooperate to interlock the outer layers of reinforcing bars 8 and 14. Thus, transverse reinforcing bar 16 interlocks reinforcing bar layers 8 and 10 (together with the bars, not shown, extending in the first and second dimensions and lying between bar layers 8 and 10), transverse reinforcing bar 18 interlocks reinforcing bar layers 10 and 12 (together with the bars, not shown, extending in the first and second dimensions and lying between bar layers 10 and 12), and transverse reinforcing bar 20 interlocks reinforcing bar layers 12 and 14 (together with the bars, not shown, extending in the first and second dimensions and lying between bar layers 12 and 14).

Figure 4:
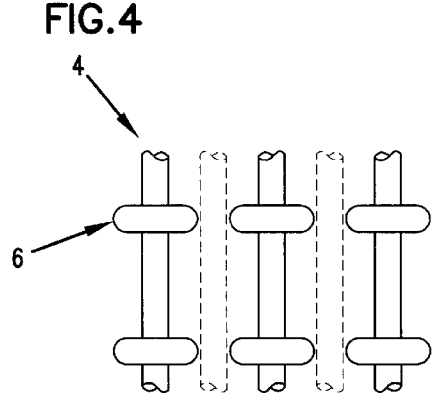
FIGS. 4 and 5 show views from above with alternative arrangement of transverse reinforcement.
Figure 5:
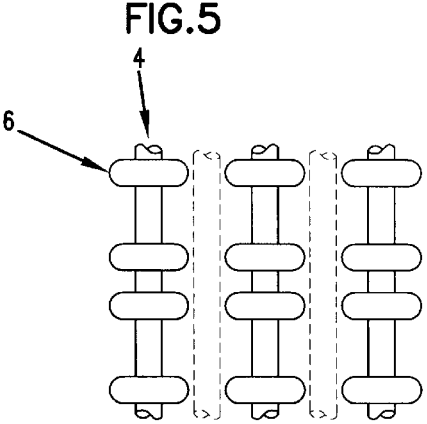

FIGS. 4 and 5 show examples of reinforcing structures e.g. as described with reference to FIG. 1 or 2 from above. The two figures show different examples of the placement of the transverse reinforcing bars 6 which wrap around and interlock the reinforcing bars 4.

FIGS. 6 and 7 shows examples of different types of transverse reinforcement suitable for interlocking reinforcing bars. In FIG. 6 the transverse reinforcement has a substantially round cross-section and is in the form of a thick circular wire/bar or a substantially circular cable formed from a multiplicity of wires. In FIG. 7 the transverse reinforcement has a rectangular cross-section and is in the form of a solid rectangular bar or a rectangular bar comprising a multiplicity of wires.

FIGS. 8 and 9 show examples of perforated plates designed to provide tension interlocking to a series of bars extending through the holes in the plates. In FIG. 8 the plate contains a multiplicity of circular holes, each of which is adapted to have a single bar extend through the hole. In FIG. 9 the plate contains a multiplicity of oblong holes, each of which is adapted to have two or more bars extend through the hole.

Figure 10:
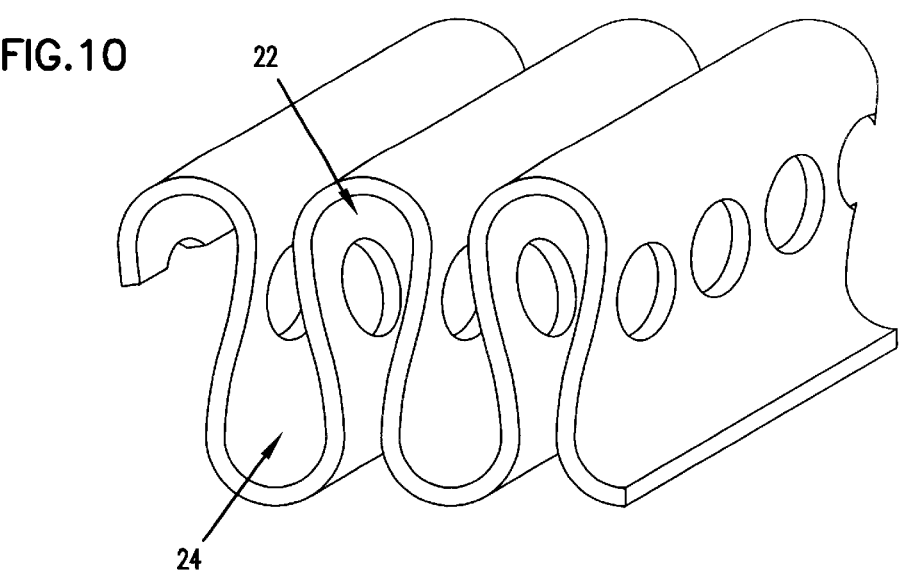
FIG. 10 shows a type of transverse reinforcement in the form of a single bent plate or sheet containing a multiplicity of series of aligned holes.

FIG. 10 shows an example of the transverse reinforcement in the form of a single bent plate or sheet containing a multiplicity of series of aligned holes, each series of aligned holes being designed to accommodate a single reinforcing bar. The bent plate or sheet further defines a series of upper and lower bays 22, 24, each of which is adapted to hold a reinforcing bar. In this structure, the transverse reinforcement thus holds a single layer of reinforcing bars extending in a first dimension through the aligned holes and two layers of reinforcing bars extending in a second dimension through the upper and lower bays 22, 24.

The matrix in the shaped articles of the present invention may be prepared from a number of different types of materials, including cement-based materials and metallic materials.

Metallic matrices in shaped articles according to the invention may be based on metal such as aluminium, copper, tin, lead, etc. or alloys such as aluminium alloys. When the matrix is based on a metal or alloy, the reinforcement will typically be of a material with a substantially higher strength than the strength of the matrix metal or alloy, e.g. steel with a tensile strength of at least 700 MPa and preferably as high as e.g. 3000 MPa. For processing reasons, the reinforcement in the case of a metal or alloy matrix should also have a substantially higher melting point and recrystallisation temperature than that of the matrix material.

A preferred metal for the matrix of the present invention will often be aluminium or an alloy thereof, aluminium being preferred because it has a number of advantageous properties. In the following, aluminium and alloys thereof are used by way of example to illustrate metal matrix based composites according to the invention, with high-quality alloy steel as an example of a suitable reinforcing material. Metal matrices based on aluminium meet to a substantial degree the general material requirements for matrix materials of the invention, e.g. in terms of rigidity (about 70 GPa), modulus of elasticity, fracture energy (about 10–30 kN/m) and compressive strength (200 MPa or more). Aluminium also has a relatively high tensile ductility: 5–30% for aluminium alloys and 50% for pure aluminium.

This combination of high strength, relatively high rigidity and high toughness, both in bulk and upon fracturing, makes the combination of an aluminium-based matrix and strong steel reinforcement particularly suited to obtain the desired mechanical behaviour of articles according to the invention. Aluminium and alloys thereof also have other properties that make them desirable for use in articles according to the invention, for example a low density which is about ⅓ the density of steel. The relatively low—but not excessively low—melting point of aluminium also makes aluminium and alloys thereof interesting for a number of applications. This allows e.g. processing by casting, possibly pressure casting, under conditions that allow the use of high quality reinforcement, e.g. high quality alloy steel, without or with only minimal thermal damage to the reinforcement during casting. Although the melting point of aluminium is significantly lower than that of e.g. steel, it is nevertheless sufficiently high (660° C. for pure aluminium) to ensure good performance over a broad temperature range.

Articles according to the invention with unique mechanical properties compared to articles of similar shape but made of monolithic high-quality steel, and with a density of only about 40–70% of that of steel, are suitable for use in e.g. cars, ships and planes to reinforce and protect against collision impact.

Metal matrices according to the invention may, however, also be based on materials having characteristics different from those of aluminium and aluminium alloys. For example, "soft" matrices based on tin, tin alloys, lead or lead alloys may be of interest for uses in which a large tensile ductility is desired. In this case, the modulus of elasticity and compressive strength may be somewhat lower than that which is otherwise required for articles of the invention (e.g. as set forth in claim 1), as long as this is balanced by a very high tensile ductility. Such materials may thus be characterised by a compressive strength of at least 15 MPa, preferably at least 25 MPa, more preferably at least 35 MPa, still more preferably at least 50 MPa, most preferably at least 80 MPa, a modulus of elasticity of at least 10 GPa, preferably at least 15 GPa, more preferably at least 25 GPa, most preferably at least 40 GPa, and a tensile ductility of at least 0.2 kN/m, preferably at least 0.3 (30%), more preferably at least 0.4, more preferably at least 0.5, more preferably at least 0.7, most preferably at least 0.8.

Another interesting aspect of the invention relates to shaped articles with metal- or alloy-based matrices in which the matrix materials provide the articles with specific non-mechanical properties such as high or low thermal conductivity, electrical conductivity, magnetic permeability, etc. A type of shaped article of particular interest is one whose matrix has a large resistance against radioactive radiation, e.g. a matrix based on lead.

In any shaped article according to the invention, including those with metal matrices as described above as well as cement-based matrices as described below, it is of particular interest to include in the matrix strong particles, fibres or whiskers, e.g. $Al_2O_3$ particles, SiC whiskers or steel fibres. Further examples of materials of which such strong particles, fibres or whiskers may be composed are carbides, oxides, nitrides, silicides, borides, metals and graphite, including TiC, ZrC, WC, NbC, AlN, TiN, BN, $Si_3N_4$, MgO, $SiO_2$, $ZrO_2$, $Fe_2O_3$, $Y_2O_3$, tungsten, molybdenum and carbon.

In addition to a metal matrix such as an aluminium or aluminium alloy based matrix, another presently preferred matrix is a cement-based matrix prepared from cement, typically Portland cement or refractory cement, ultrafine particles, in particular ultrafine silica dust particles (microsilica), fibres, a dispersing agent, in particular a concrete superplasticizer, and water.

One such cement-based matrix is described in EP 010777, which discloses strong and dense cement-based composite materials containing a matrix of ultrafine silica particles (A) of a size of from 50 Å to 0.5 μm homogeneously arranged to fill the voids between densely packed fine particles (B) of a size of 0.5–100 μm, at least 20% and typically at least 50% of the particles B being Portland cement particles. The amount of ultrafine silica particles A in the matrix is quite large, i.e. in the range of 5–50% by volume, typically 10–30%, based on the total volume of particles A+B. The material is further characterized by a very low water/powder ratio, i.e. 0.12–0.30 and preferably 0.12–0.20 by weight based on the weight of particles A+B, which is made possible by use of a large amount of a concrete superplasticizer, i.e. 1–4% by weight of superplasticizer dry matter, typically 2–4%, based on the weight of the cement and silica dust. The fibres may e.g. be selected from metal fibres, including steel fibres, mineral fibres, including glass fibres, asbestos fibres and high temperature fibres, Kevlar fibres, carbon fibres, and organic fibres, including plastic fibres. The fibres may also comprise e.g. fibres or whiskers of silicon carbide, boron, graphite or alumina. For purposes of the present invention, metal fibres, in particular steel fibres, are presently preferred, although other types of fibres, in particular high strength fibres such as Kevlar fibres or silicon carbide fibres or whiskers, may also be used. As is described in EP 010777, the mixture of the various components normally appears unusually dry due to the relatively small amount of water which is used, and mixing must therefore be performed for an extended period of time compared to conventional concrete mixes in order to obtain a mix with a fluid to plastic consistency and with the desired dense packing of the particles B with the ultrafine silica particles A in the voids between the densely packed particles B.

Preferably, the aggregate used in cement-based matrixes of this type is a strong aggregate as described in EP 042935. The strong aggregate may be described as comprising particles having a size of 100 µm–0.1 m and a strength corresponding to at least one of the following criteria:

1) a compaction pressure of above 30 MPa at a degree of compaction of 0.70, above 50 MPa at a degree of compaction of 0.75, and above 90 MPa at a degree of compaction of 0.80, as assessed by uniaxial die pressing on initially loosely packed particles of the material having a size ratio between the largest and smallest particle substantially not exceeding 4, 2) a Moh's hardness (referring to the mineral constituting the particles) exceeding 7, and 3) a Knoop indentor hardness (referring to the mineral constituting the particles) exceeding 800.

Examples of such strong aggregate particles are topaz, lawsonite, diamond, corundum, phenacite, spinel, beryl, chrysoberyl, tourmaline, granite, andalusite, staurolite, zircon, boron carbide, tungsten carbide, silicon carbide, alumina and bauxite. A preferred strong aggregate material is refractory grade bauxite.

A preferred matrix for the shaped articles of the present invention is in particular one which makes use of the principles described in WO 87/07597. As mentioned above, this reference discloses a compact reinforced composite (CRC) material comprising a base matrix corresponding to the composite materials described in EP 010777 and EP 042935, this base matrix being reinforced with a high content of relatively fine fibres and further reinforced with a high content of main reinforcement in the form of e.g. steel bars, wires or cables.

The CRC structure may be described as a shaped article in which the article itself, the matrix comprising the main reinforcement or the base matrix has a high stiffness in any direction as defined by at least one of the following criteria:

1) the modulus of elasticity in any direction being at least 30,000 MPa, preferably at least 50,000 MPa, or 2) the resistance to compression in any direction being at least 80 MPa, preferably at least 130 MPa, the matrix containing fibres in a volume concentration of at least 2%, preferably at least 4%, typically at least 6%, e.g. 10% or more, based on the volume of the matrix, and the volume concentration of the main reinforcement in the tensile zone or zones of the article being at least 5%, preferably at least 7%, typically at least 10%, e.g. at least 15%.

When the CRC structure has a cement-based matrix, it provides a material with a strength like that of structural steel, while at the same time providing the advantages of a composite material. This allows the achievement of various desirable properties not available with materials such as steel, for example chemical resistance, and further allows the construction of large, massive structures for which conventional materials such as steel or conventional reinforced concrete are unsuitable. The main principle upon which the CRC structure is based is thus the combination of a relatively large amount of heavy main reinforcement embedded in a fibre-reinforced matrix which is strong and very rigid, but also very ductile in spite of the fact that the cement-based base matrix material per se is hard and brittle. The CRC materials thus function in a similar manner to conventional reinforced concrete, i.e. the pressure load is predominantly carried by the fibre-reinforced matrix and the tensile load is predominantly carried by the main reinforcement, the fibre-reinforced matrix transferring forces between the components of the main reinforcement. Such CRC materials, with their unique combination of a strong base matrix and a high content of main reinforcement, are able to resist much greater loads than conventional steel-reinforced concrete and are therefore suitable for a wealth of applications for which conventional reinforced concrete is unsuitable.

The CRC materials described in WO 87/07597 show a unique combination of strength, rigidity and ductility and are well-suited for very large load-bearing structures. However, they do not include the tension interlocked main reinforcement which is a key feature of the hard impact resistant composites of the present invention.

As mentioned above, the intricate arrangement of the reinforcement according to the present invention was not contemplated or suggested in WO 87/07597, despite the emphasis in this document on the properties of both the matrix and the reinforcement. This is related to the fact that the CRC materials as described in WO 87/07597 were found to provide such dramatic improvements compared to e.g. ordinary reinforced concrete, for example in bending tests, that a special transverse reinforcement such as that according to the present invention was clearly not considered as a possibility.

Although these CRC structures without any transverse reinforcement 5 were found to perform extremely well compared to ordinary reinforced concrete, the possible use of transverse reinforcement in the form of short, straight bars is discussed at pages 67–70 of WO 87/07597 in connection with plates designed for resistance to explosion or impact with strongly concentrated loads, in order to obtain an even better performance under such conditions. It is worth noting, however, that the only type of transverse reinforcement that is suggested is in the form of very short (length 100 mm) straight bars placed perpendicular to main reinforcing bars (cf. FIGS. 17b and 46 of this document). There is no suggestion to use any kind of interlocking transverse reinforcement or any other kind of transverse reinforcement, nor is there anything in this document that would motivate a person skilled in the art to use any type of interlocking transverse reinforcement, especially given the description in WO 87/07597 (Example 7) of how even very short bars are effectively anchored in the CRC structure.

In fact, explosion impact tests performed after the publication of WO 87/07597 and using an explosive charge of 3 kg showed that although CRC plates containing 100 mm transverse reinforcing bars performed remarkably well compared to normal reinforced concrete (which was completely destroyed by even a much smaller amount of explosive), they nevertheless suffered significant damage in the immediate vicinity of the explosion. The tests with the CRC plates are described below with reference to FIG. 13, and they are also described in the publication "Ny Beton—Ny Teknologi", available from Aalborg Portland, Denmark. Thus, even though the CRC structures described in WO 87/07597 provided quite remarkable results in terms of resistance to concentrated loads such as explosions, there is still room for improvement in ways not contemplated by WO 87/07597.

Test Methods

Where reference is made herein to the compressive strength, modulus of elasticity and fracture energy of matrix materials according to the invention, these properties may be determined on matrix material samples (i.e. samples prepared without reinforcement) as follows:

Matrix Compressive Strength

The compressive strength is determined on a cylindrical sample of the matrix material with a diameter of 10 cm and a height of 20 cm, using a conventional static test arrangement with a slowly increasing load.

Matrix Modulus of Elasticity

The modulus of elasticity is determined on the basis of stress-strain curves obtained from compression tests on cylindrical samples (diameter 10 cm, height 20 cm).

Matrix Fracture Energy

The fracture energy is determined using 3-point bending tests according to the RILEM TC 50—FCM recommendations. The beams have dimensions of 100×100×840 mm with a central notch having a depth of 50 mm. The beams are supported symmetrically using two supports separated by a distance of 800 mm and are loaded with a single central force.

It is also possible to obtain a rough approximation of the matrix compressive strength and modulus of elasticity on shaped articles according to the invention (i.e. articles containing reinforcement). For example, the approximate compressive strength of a matrix material can be determined by surface penetration measurements in which a hard object is pressed into the material. The approximate modulus of elasticity can for example be determined using acoustic measurements or oscillation measurements.

In this case, the conversion to standard values is performed taking into consideration the effect of the reinforcement as well as known or estimated relationships between the results of measurements performed in this manner and the results of measurements performed using standard test methods.

The tensile strength and ultimate strain of the reinforcing bodies can be determined using conventional tensile tests with a slowly increasing load, typically according to standard procedures for the reinforcement in question. Although it is possible to perform measurements on reinforcement that has been mechanically removed from a shaped article prepared according to the invention, determination of reinforcement properties will preferably be performed on separate reinforcing bodies of the same type as those used in the shaped article in question.

Measurements on shaped articles according to the invention, or on matrix materials or reinforcing bodies used for such shaped articles, will typically be performed at ambient temperature, i.e. typically at about 20° C.

The invention will be further illustrated in the following non-limiting examples.

EXAMPLES

Example 1

This example describes articles according to the invention, namely 5 plates each having outer dimensions of 1500×1500×200 mm.

The example shows:
1. the construction/design of the articles, including structure of the matrix material and the binder;
2. the composition of the matrix material and the type and amount of the different components;
3. preparation of the plates:
   a) processes for mixing the components which form the hard, rigid, tough matrix materials,
   b) mixing of the matrix materials (in a fluid to plastic condition) with the dense and strong three-dimensional reinforcing structure of the articles, and
   c) solidifying the matrix materials; and
4. the behaviour of the articles according to the invention when subjected to a very large high velocity impact (being hit by an armour-piercing shell weighing 47 kg with an impact speed of 482 m/sec).

Construction of the Articles 5 plates, each having dimensions of 1500×1500×200 mm, were prepared. The reinforcement is as shown in FIG. 1. The articles contain main reinforcement arranged in 2 dimensions in the plane of the plates in the form of straight bars of deformed steel ("kamstål") with a diameter of 25 mm with 3 layers of bars in the X direction and 2 in the Y direction. The distance between the reinforcing bars in both the X and Y direction is 50 mm, referring to the distance between the centres of the bars (in other words 25 mm between the edges of the bars). The main reinforcement is spatially bound together by transverse reinforcement which functions in the transverse direction of the plates. The transverse reinforcement consists of long deformed steel bars with a diameter of 10 mm which are bent as shown in FIG. 1 with straight parts and curved parts, the curved parts having a curve radius of about 25 mm.

The transverse reinforcement at the top winds closely around the upper reinforcing bars and at the bottom around the lower bars ("top" and "bottom" here being with reference to the top and bottom planes of the plates during production thereof). The curved transverse reinforcing bars hold each of the reinforcing bars in the 100 mm layer of main reinforcement (100 mm between the centre of the top and bottom bars) together. This arrangement is obtained with the transverse reinforcing bars arranged so that every other transverse reinforcing bar is offset 50 mm in the Y direction. This ensures the arrangement shown in FIG. 1 where all of the top and bottom reinforcing bars are intimately connected. The vertical parts of the transverse reinforcing bars between the top and bottom reinforcement are oriented substantially perpendicular to the plane of the plates, in other words substantially in the Z direction.

The deformed steel reinforcing bars for both the main reinforcement (25 mm diameter) and the transverse reinforcement (10 mm diameter) has a stated yield value of above 410 MPa. The yield stress is estimated to be 500–510 MPa, the rupture stress (tensile strength) 610 MPa, and the strain at rupture 25% in the rupture zone measured on a length 10 times the diameter and 14% outside the rupture zone.

Matrix

The matrix material fills substantially the space limited by 1) the finished article's outer spatial dimensions, in other words corresponding to the internal dimension in boxes measuring 1500×1500×200 mm internally, and 2) the reinforcement described above, which substantially fills the space defined by these dimensions. (Estimated trapped air: at the most 1–2% by volume.)

The matrix is prepared from:
1) strong particles of calcined bauxite having sizes in the ranges of 0–2 mm and 5–8 mm,
2) strong short steel fibres (length 12 mm, diameter 0.4 mm),
3) a strong and dense so-called DSP binder of the type described in EP 010777 comprising Portland cement, microsilica and a concrete superplasticizer, and
4) water.

The volume proportions are:

| | |
|---|---|
| bauxite particles | 51.6% |
| steel fibres | 4.0% |
| binder | 30% |
| water | 14.4%. |

The binder is an extremely strong, hard and dense material formed by solidification of a material prepared from cement particles (median size about 10 $\mu$m) (the "fine particles") and microsilica (median size 0.1–0.2 $\mu$m) (the "ultrafine particles") arranged in a very homogeneous and very dense configuration with liquid (water containing dissolved dispersing agents) substantially filling the space between the densely packed fine and ultrafine particles.

The "submatrix" containing cement, microsilica and superplasticizer contains approximately 79% by weight of cement, 20% by weight of microsilica and 1% by weight of superplasticizer.

Upon solidification, a part of the cement and some of the microsilica form a chemical compound with the liquid, thereby forming a strong, dense "glue" which binds the non-chemically reacting parts in a very dense and strong structure. The "glue" which is formed (mainly calcium silicate hydrates) fills a substantially larger volume than the volume of the dry matter which has been reacted. This results in a very dense solid structure with a very small internal porosity, i.e. a porosity substantially less than the porosity of the material before the chemical reaction.

The matrix was prepared by mixing together INDUCAST 6000 GT from Densit A/S (Aalborg, Denmark), bauxite 5–8 mm, steel fibres and water. The mix composition of the complete matrix was: INDUCAST 6000 GT, 1486.24 kg; bauxite, 1023.63 kg; water, 142.72 kg; steel fibres, 307.09 kg.

The mixing was performed in a large forced action mixer for 7–8 minutes for each of the 5 plates of 1500×1500×200 mm. Dry mixng without fibres was performed for about 2 min, followed by addition of water and mixing for about 10 min and then addition of fibres and additional mixing for about 5 min. Casting took place on a vibration table using vibration. Hardening of the plates took place in a "hot tent" covered with plastic, at a temperature of about 40° C. for 7 days.

The hardened matrix material has the following properties (estimated values based on the inventor's previous experience with the same type of matrix material):

| | | |
|---|---|---|
| compressive strength | 225–250 | MPa |
| modulus of elasticity | 60–80 | GPa static |
| | 70–90 | GPa dynamic |
| fracture energy | 15–30 | kN/m |
| density | 2900 | kg/m3 |

Testing of the Plates

Shaped articles in the form of plates prepared as described above were subjected to a test to determine their ability to resist high velocity impact of a non-exploding armour-piercing shell with a steel tip. The shell had a diameter of 152 mm, a weight of 47 kg and an impact speed of 482 m/sec. (It is interesting to note that although the shell was non-exploding, it did in fact contain 2.5 kg of explosive at the back of the shell, but no detonator, and it was found that the explosive upon impact was thrown backwards about 100 m).

Figure 11:
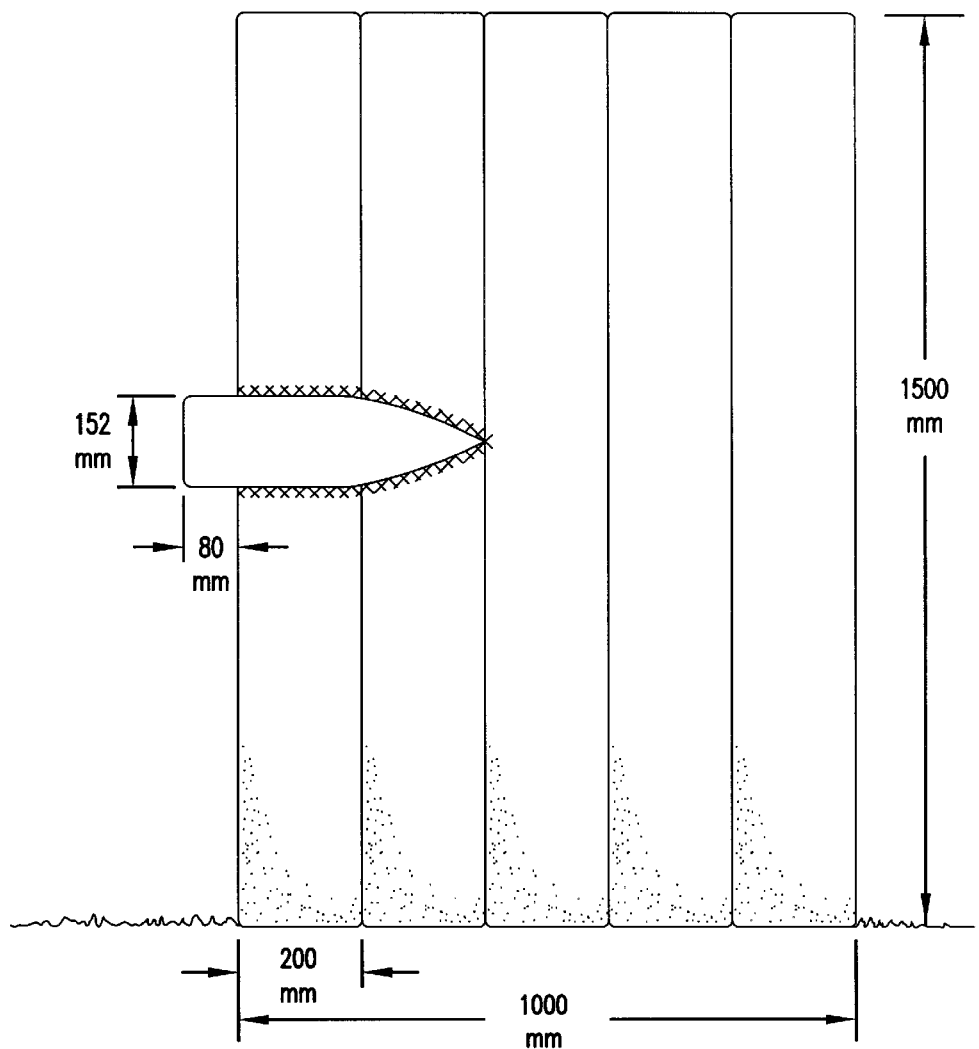
FIG. 11 shows a view from the side illustrating the high velocity impact of a projectile in a material according to the invention.

The test arrangement is shown in FIG. 11. The 5 test plates, each having a thickness of 200 mm, were fastened to each other using strong bolts to provide an article in the form of a composite block having a total thickness of 1000 mm. This article was shot in the centre with the armour-piercing shell fired from a cannon at a distance of 100–200 m.

As a control, cement based plates with the same dimensions and placed in the same arrangement with 5 plates fastened together were tested in the same manner. These control plates were prepared from a very strong and dense cement-based material corresponding to that which is described above with reference to EP 010777. They contained about 3–5% by volume of steel fibres, of which some had lengths of 6–12 mm and some had lengths of up to 40 mm, and 20–30% of aggregate comprising bauxite particles as well as larger (up to about 16 mm) particles of granite. The control plates did not contain a steel bar reinforcement, but they were prepared using a square steel frame at the edges of the plates.

The control plates, despite being of a material which is extremely strong and durable under normal, static conditions, showed "normal" behaviour with very extensive damage after being hit by the shell. The first plate had a very large hole in it, and material from this plate was expelled backwards to the side and up. The second plate was even more damaged than the first, with the sides being pushed out and the upper approximately ⅓ of the plate being blown away. In both the first and second plates, the steel frame surrounding the plates was blown to pieces. The projectile stopped in the back of the third plate, which also suffered extensive damage. Plate 4 was also damaged, although less so than the other plates. Plate 5 had a partial hole, with a cone shaped piece pushed out and back a distance of about 20 cm, and with 4 large cracks extending from the centre towards the corners, the cracks having openings of about 5 cm.

As illustrated in FIG. 11, the composite block composed of plates according to the invention suffered only a minimal amount of damage as a result of this high velocity impact. The 47 kg shell, which had a length of about 0.5 m, penetrated only the first 2 plates, where it ended being lodged with about 8 cm of the back end extending out of the first plate. Other than this local penetration and some damage to the matrix in the immediate vicinity of the impact, the article was essentially undamaged despite the extremely large amount of energy carried by the shell upon impact. The damage of the matrix in the immediate vicinity of the impact consisted of surface damage of matrix material lying outside the reinforcement, this damage extending to a depth of about 10–20 mm and having a diameter of about 30–40 cm. Outside of this zone, fine radial cracks were seen in the otherwise apparently undamaged front surface of the first plate extending outwards from the shell in the direction of the edges of the plate. In the vicinity of the shell, the top of the transverse reinforcement and a portion of the top layer of main reinforcement was visible.

Example 2

2 plates having outer dimensions of 500×500×100 mm were prepared in a manner similar to that described in Example 1, i.e. 3+2 layers of main reinforcement in the form of deformed steel bars interlocked with transverse reinforcement also in the form of steel bars wrapped around the outer layers of main reinforcement. In this case, however, the main reinforcing bars had a diameter of 12 mm and the transverse reinforcing bars had a diameter of 6 mm. The matrix was substantially as described in Example 1, although with the steel fibres being 0.15×6 mm (tensile strength 2900 MPa) and the aggregate being SiC instead of bauxite and of a slightly smaller particles size than the bauxite particles of Example 1.

The plates were not subjected to impact testing, but this example illustrates the possibility, in relation to Example 1, to upscale or downscale the size of the shaped articles prepared according to the invention.

Example 3 (Comparative Example)

The behaviour of materials is in many ways fundamentally different under high velocity impact than under the effect slow static forces, high velocity impact often resulting in fatal failure or destruction of articles which otherwise have very high load bearing capabilities under static conditions. FIGS. 12a, 12b and 12c show a very strong, tough and hard article made from an extremely strong and tough DSP material whose matrix includes $Al_2O_3$ rich particles of a size of 1–4 mm and 4% by volume of steel fibres, the article being reinforced with about 25% by volume of strong steel bars (deformed steel) with a diameter of 25 mm, the distance between the centres of two adjacent bars in the same dimension being 50 mm. The article is composed of 5 individual plates, each having a thickness of 200 mm. Such plates are extremely strong under static conditions, e.g. having a bending strength in the Y direction in the range of 200–250 MPa and about 50–100 MPa in the X direction. However, under high velocity impact with a 4.5 kg tungsten projectile having a diameter of 50 mm and an impact speed of about 1400 m/sec, the material from the first 2 plates was shattered and violently cast backwards (see FIG. 12b +12c).

Under this high velocity impact, very powerful shock waves were created, which in turn induced very powerful tensile effects that totally shattered the effected plates. In spite of their extremely high static strength and very high degree of steel bar reinforcement, these plates showed very poor resistance to these high velocity tensile effects.

Example 4 (Comparative Example)

Figure 13:
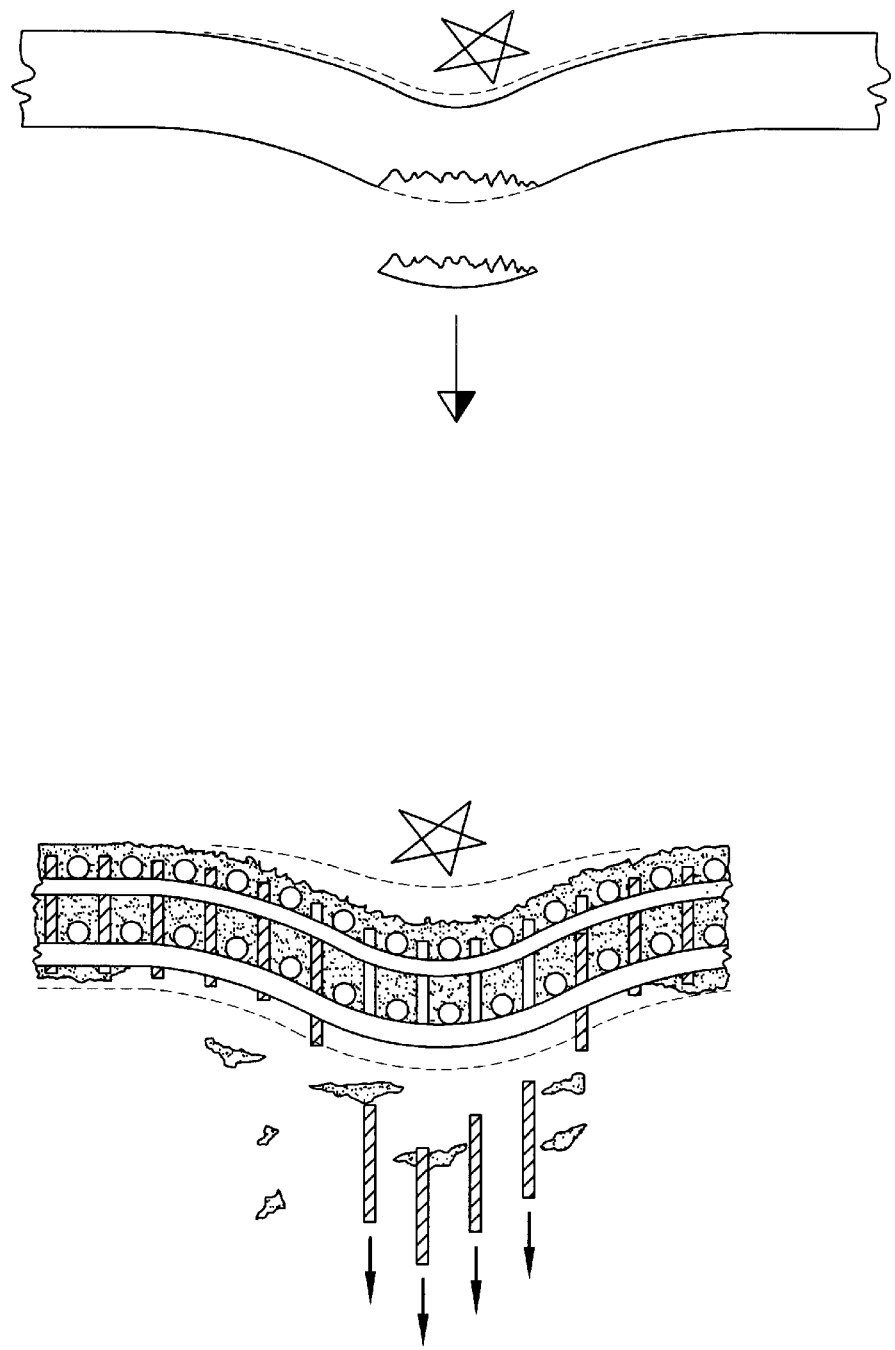
FIG. 13 shows a view from the side illustrating the effect of an explosive impact on a reinforced prior art material.

FIG. 13 shows a cross section of an extremely strong and tough reinforced cement-based plate according to the prior art. This plate is formed from a strong and tough DSP material with very strong aggregate particles ($Al_2O_3$ rich sand) and a high volume concentration of strong fine fibres (6% by volume of steel fibres 0.15×6 mm with a tensile strength of 2900 MPa). These plates contained about 20% by volume of main reinforcement (deformed steel bars, diameter 16 mm) in the plane of the plates. The plates contained 35 in addition transverse reinforcement in the form of 100 mm long deformed steel bars with a diameter of 10 mm in the Z (transverse) direction for each 40 mm in the X and Y directions, 7% by volume. These transverse reinforcing bars were connected to the main reinforcement above by welding and resulted in a significant positive effect in experiments under static conditions.

The behaviour of these plates when subjected to the force of 3 kg of explosive was exceptionally good and was comparable in many ways to that of a 70 mm sheet of steel. While reacting much better than similar plates without the transverse reinforcing bars, they still suffered considerable damage, however. As shown in FIG. 13, the explosion (indicated by the star) resulted in damage in the form of a considerable delamination of the centre zone on the back side, where the outer layer of reinforcement after the explosion was bent about 40 mm away from its original position. The explosion also resulted in a powerful expulsion of most of the 100 mm long transverse reinforcing bars (also shown in FIG. 13), despite the fact that these bars were welded to the main reinforcement. Although the transverse reinforcement in this case undoubtedly had an effect in terms of stabilising the plate and holding the material within a certain distance from the explosion zone, the plate nevertheless suffered considerable damage.

Example 5

Figure 16A:
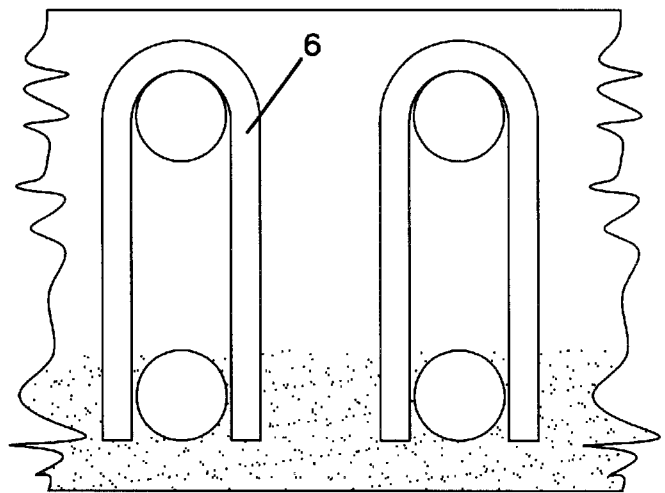
FIGS. 16a and 16b, 17a and 17b and 18a, 18b, 18c, 18d and 18e show schematically the behaviour of prior art reinforced materials upon exposure to high velocity impact.
Figure 16B:
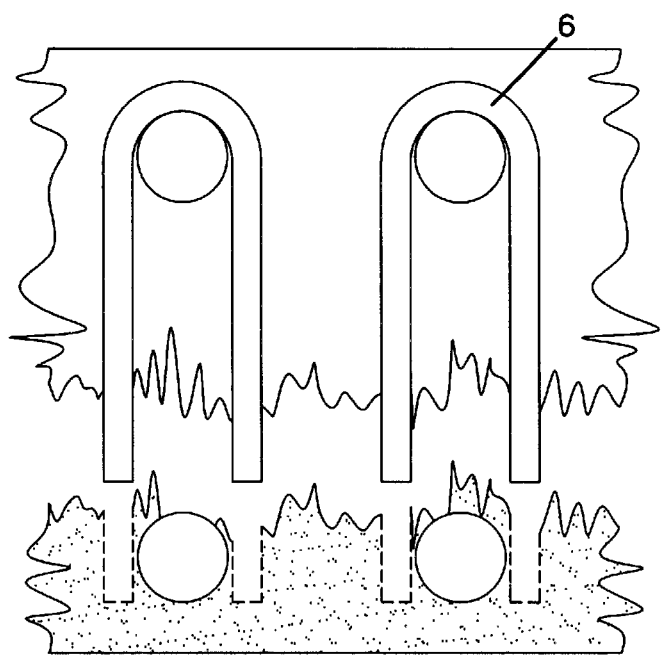
Figure 17A:
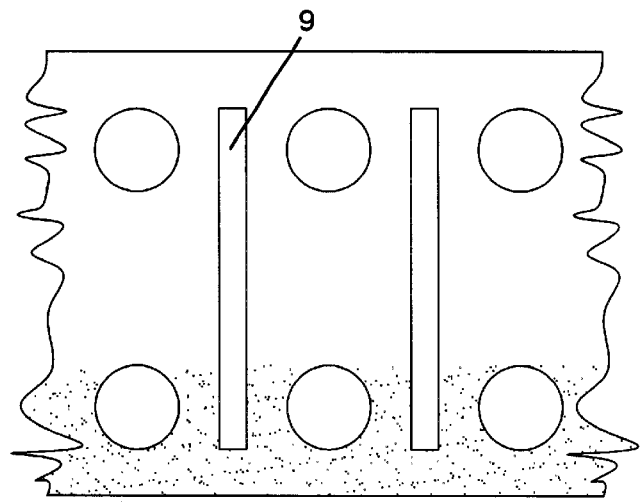

FIGS. 14a and 14b and 15a and 15b show schematically two different reinforcing systems according to the present invention and how these systems react under high velocity impact, while FIGS. 16–18 show examples of prior art reinforcing systems and how these react under high velocity impact.

FIGS. 14a and 14b and 15a and 15b show cross sections of reinforcement according to the invention with a top layer of main reinforcement 1 and a bottom layer of main reinforcement 2. (As shown e.g. in FIGS. 1–3, there will typically be several layers of main reinforcement, as well as main reinforcement extending both in the plane of the paper and perpendicular thereto, but for the sake of simplicity only the top and bottom layers of main reinforcement are shown in the figures related to this example).

This example shows the effects of subjecting the various plates or plates shown to a momentary high velocity impact from above, e.g. by means of an explosive as described in Example 4. The pressure impulse is reflected at the bottom side in a tension impulse which creates a lower zone 3 moving downward at a high speed. The zone 3 would be flung away from the upper part in the absence of the transverse reinforcement 4 according to the invention, which ensures that the reinforcing system is mechanically interlocked, in this case with respect to influences perpendicular to the plane of the plate.

The upper reinforcing bars 1 are individually fixed to individual lower reinforcing bars 2 by the tension-based interlocking of the transverse reinforcement 4. This means that failure of the article only can take place after the transverse reinforcement 4 has been broken in tension. By fixating and mechanically holding together all of the outer reinforcing bars with effective tension connections between the two outer layers, a complete mechanical fixation of the intermediate reinforcing layers (not shown) is also obtained (e.g. as shown in FIG. 1).

Figure 14A:
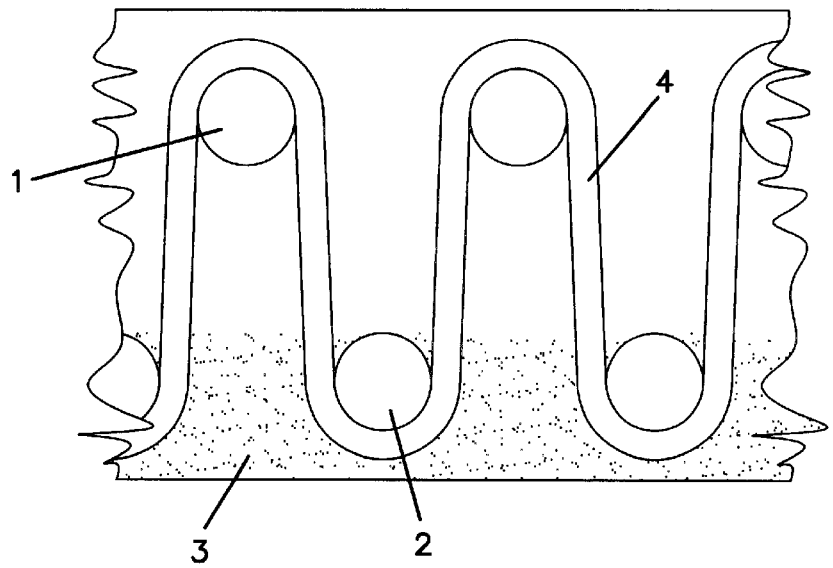
FIGS. 14a and 14b and 15a and 15b show schematically the behaviour of materials according to the invention upon exposure to high velocity impact.
Figure 14B:
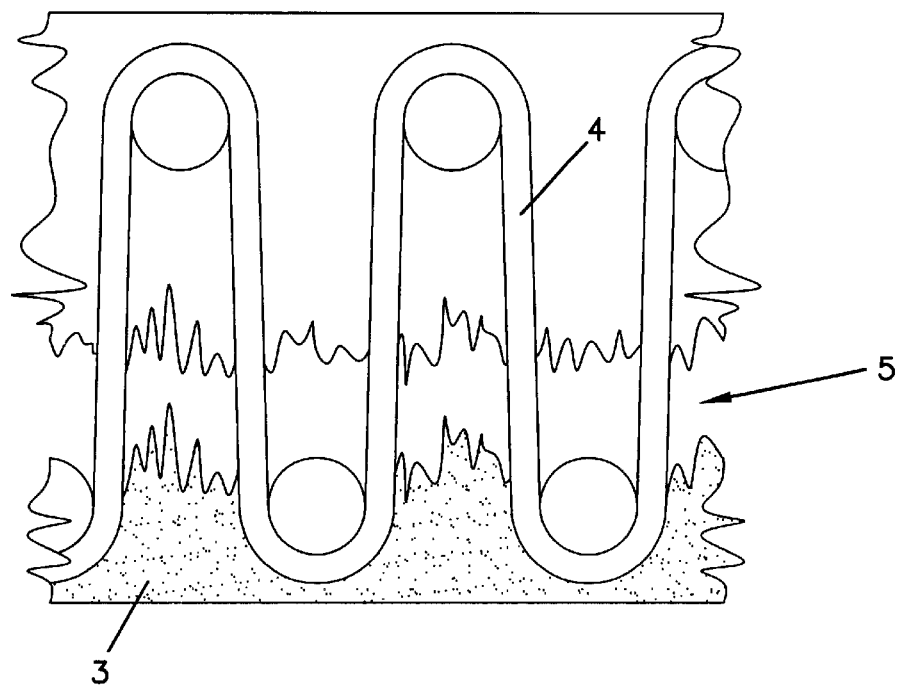
Figure 15A:
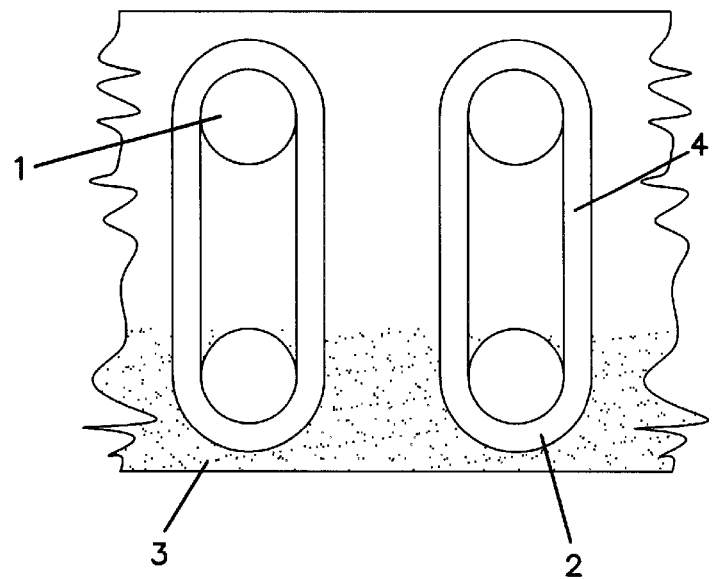
Figure 15B:
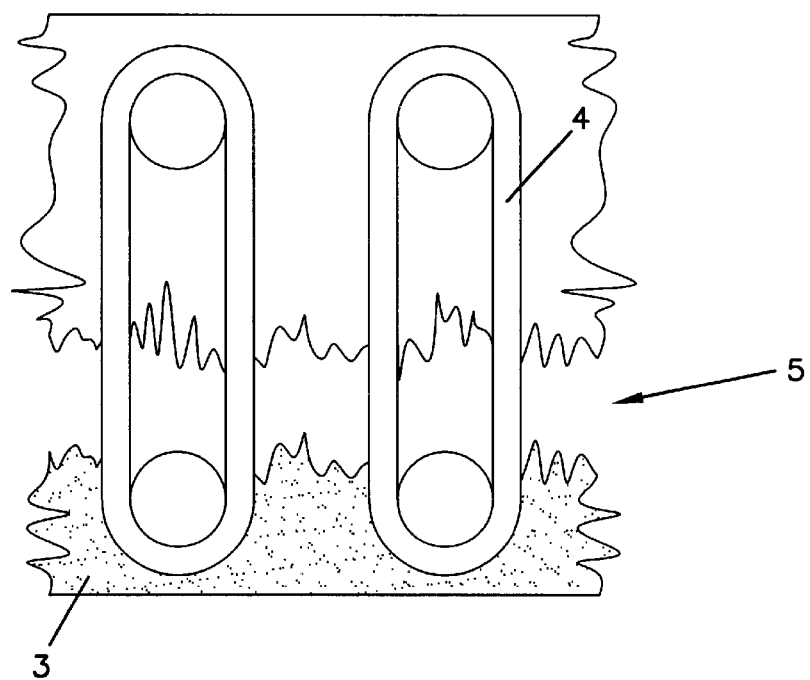

FIGS. 14a and 15a show the situation before the lower zone 3 has moved relative to the upper zone. FIGS. 14b and 15b show the situation shortly after the explosion, when the lower zone 3 has moved the maximum amount relative to the upper zone. In this theoretical example, the matrix material has failed in FIGS. 14b and 15b, resulting in the formation of cracks or openings 5, but the interlocking transverse reinforcement 4 prevents total failure of the article by holding the upper main reinforcement 1 and the lower main reinforcement 2 together in tension. In FIGS. 14b and 15b, the transverse reinforcement 4 has thus become longer (and thinner) than was the case in FIGS. 14a and 15a.

The prior art plates shown in FIGS. 16a and 16b, 17a and 17b and 18a, 18b, 18c, 18d and 18e also contain upper and lower layers of main reinforcing bars together with transverse reinforcement 6, 7, 8, but the transverse reinforcement does not provide effective mechanical tension interlocking of the main reinforcing bars in the respective systems.

Figure 17B:
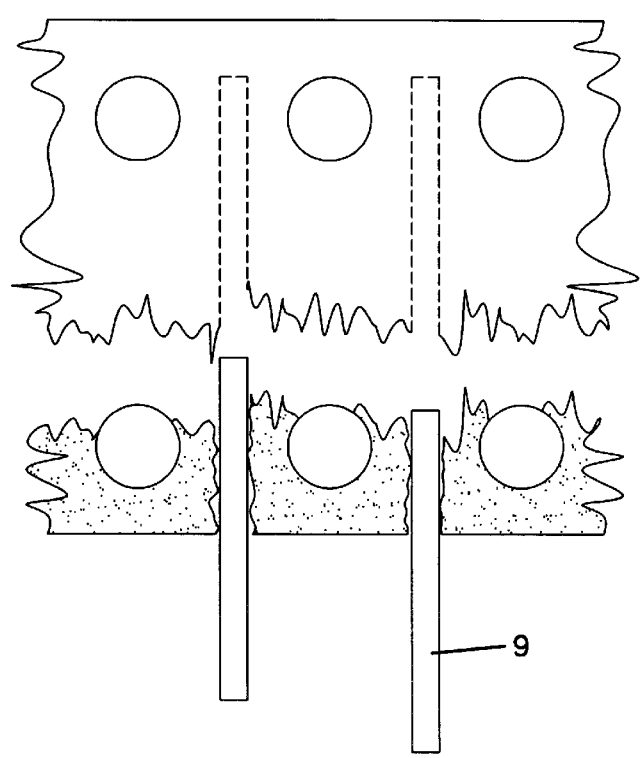
Figure 18C:
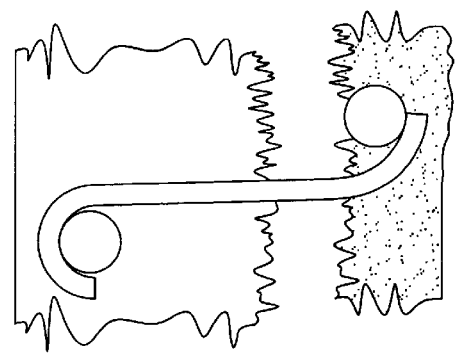
Figure 18E:
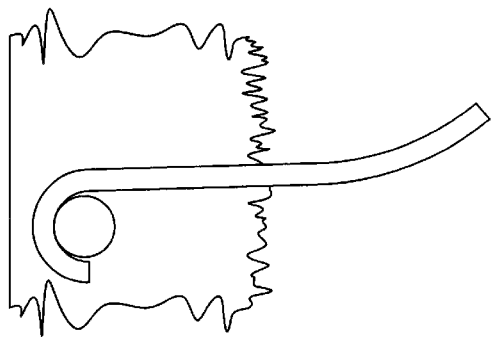
Figure 18B:
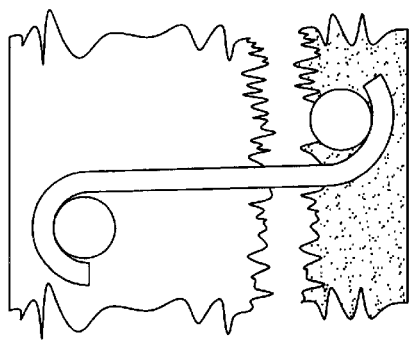
Figure 18D:
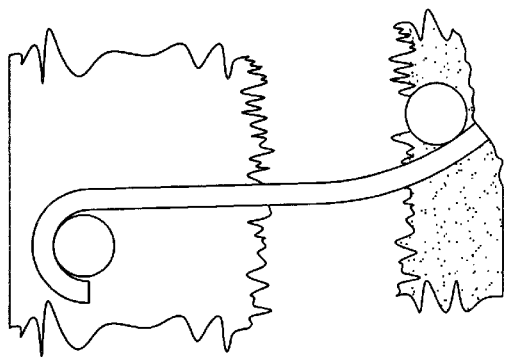
Figure 18A:
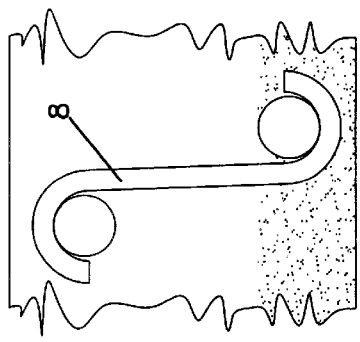

In FIGS. 16a and 16b and 17a and 17b the transverse reinforcement does not provide any mechanical interlocking of the main reinforcement. When the matrix fails in these systems (shown in FIGS. 16b and 17b), the transverse reinforcement provides no additional coherence for the article, and the result is total failure. In FIG. 17b, where the transverse reinforcement is in the form of straight bars, there is even the risk that the transverse reinforcement can be dangerous, since these transverse bars 9 can be "shot out" of the article by the pressure impulse, as described in Example 4.

In FIGS. 18a, 18b, 18c, 18d and 18e the transverse reinforcement 8 provides a certain mechanical interlocking of the upper and lower main reinforcing bars, but this is not tension-based interlocking. As a result, the transverse reinforcement fails upon bending, and this typically takes place at impact effects which are orders of magnitude smaller than that which can be tolerated by the tension-based interlocking reinforcement of the present invention. FIGS. 18a–18e show successively an increasing degree of failure of the transverse reinforcement by bending of the bottom part of the transverse reinforcement, which in the beginning is curved around the lower reinforcing bar, until the bottom part of the transverse reinforcement has essentially lost its curvature and thus lost its grip on the bottom reinforcing bar. At this point, FIG. 18e, the result is a total failure of the material.

What is claimed is:

1. A shaped article, at least one domain of which comprises a three-dimensionally reinforced composite structure that comprises a matrix and a reinforcing system, the reinforcing system comprising a plurality of bodies embedded in the matrix and extending three-dimensionally in first, second and third dimensions therein, the reinforcing system being tension interlocked in at least one dimension in that reinforcement components extending in at least one of the first and second dimensions are tension interlocked to reinforcement components extending in the same dimension(s), but at a transverse distance therefrom, by transverse reinforcement components extending in a dimension transverse to a plane or surface defined by the reinforcement in the at least one of the first and second dimensions, wherein the matrix has a compressive strength of at least 80 MPa, a modulus of elasticity of at least 40 GPa, and a fracture energy of at least 0.5 kN/m, the reinforcing bodies having a tensile strength of at least 200 MPa, and the volume proportion of the reinforcing bodies in the reinforced composite structure being at least 2%, the volume proportion in any specific direction being at least 0.5%.

2. The shaped article of claim 1 wherein the volume proportion of the reinforcing bodies in the reinforced composite structure is at least 4%, the volume proportion in any specific direction being at least 0.75%.

3. The shaped article of claim 2 wherein the volume proportion of the reinforcing bodies in the reinforced composite structure is at least 6%, the volume proportion in any specific direction being at least 1%.

4. The shaped article of claim 1 wherein the number of reinforcing components in the reinforced composite structure domain is at least 3 in any of the first, second and third dimensions of an arbitrary rectangular reference coordinate system in the reinforced composite domain.

5. The shaped article of claim 1 wherein the ultimate strain of the reinforcing bodies is at least 2%, with the proviso that when the reinforcing bodies have a tensile strength between 200 and 300 MPa then the ultimate strain is at least 20%, and when the reinforcing bodies have a tensile strength between 301 and 400 MPa, then the ultimate strain is at least 15%.

6. The shaped article of claim 5 comprising reinforcement components comprising bars extending in the first and second dimensions, at least bars of outermost opposite planes or surfaces of the reinforcement being tension interlocked by transverse reinforcement components extending in the third dimension.

7. The shaped article of claim 5 comprising reinforcement components in the form of bars extending in at least one of the first and second dimensions, at least bars of outermost planes or surfaces of the reinforcement being tension interlocked in at least one direction by being fixed in perforations of perforated plates extending in the second and third dimensions.

8. The shaped article of claim 1 wherein the transverse reinforcement components tension interlock reinforcement components of opposite outermost or substantially outermost planes or surfaces of the reinforcement, each of said substantially outermost reinforcement planes or surfaces being defined by reinforcement components extending in at least one of the first and second dimensions.

9. The shaped article of claim 1, wherein the matrix material has a compressive strength of at least about 100 MPa.

10. The shaped article of claim 1, wherein the matrix material has a modulus of elasticity of at least about 60 GPa.

11. The shaped article of claim 1, wherein the matrix material has a fracture energy of at least about 1 kN/m.

12. The shaped article of claim 1, wherein the reinforcing bodies have a tensile strength of at least about 400 MPa.

13. The shaped article of claim 1, wherein the ultimate strain of the reinforcing bodies is at least about 4%.

14. The shaped article of claim 1, wherein the volume proportion of the reinforcing bodies in the domain which has the reinforced composite structure is at least about 8% and the volume proportion of the reinforcing bodies in any specific direction of the domain is at least about 2%.

15. The shaped article of claim 1 wherein the number of reinforcing components in the reinforced composite structure domain is at least 8 in any of the first, second and third dimensions of an arbitrary rectangular reference coordinate system in the reinforced composite domain.

16. The shaped article of claim 15 wherein the matrix further contains a strong aggregate comprising particles having a size of 100 $\mu$m–0.1 m and a strength corresponding to at least one of the following criteria:

1) a compaction pressure of above 30 MPa at a degree of compaction of 0.70, above 50 MPa at a degree of compaction of 0.75, and above 90 MPa at a degree of compaction of 0.80, as assessed by uniaxial die pressing on initially loosely packed particles of the material having a size ratio between the largest and smallest particle substantially not exceeding 4, 2) a Moh's hardness (referring to the mineral constituting the particles) exceeding 7, and 3) a Knoop indentor hardness (referring to the mineral constituting the particles) exceeding 800.

17. The shaped article of claim 16, wherein the strong aggregate particles are selected from topaz, lawsonite, diamond, corundum, phenacite, spinel, beryl, chrysoberyl, tourmaline, granite, andalusite, staurolite, zircon, boron carbide, tungsten carbide, silicon carbide, alumina and bauxite.

18. The shaped article of claim 1 wherein the matrix comprises matrix particles and fibers held together by a binder, the content of matrix particles and fibers in the matrix being at least about 50% by volume, and the content of fibers in the matrix being at least about 1% by volume.

19. The shaped article of claim 18, wherein the content of matrix particles and fibers in the matrix is at least about 60% by volume, and the content of fibers in the matrix is at least about 2% by volume.

20. The shaped article of claim 1 wherein the matrix is prepared from a submatrix comprising fine particles having a size of 0.5–100 μm, ultrafine particles having a size of from 50 Å to less than 0.5 μm, a dispersing agent and water.

21. The shaped article of claim 20, wherein the fine particles comprise cement particles, the ultrafine particles comprise microsilica particles and the dispersing agent comprises a concrete superplasticizer.

22. The shaped article of claim 1, wherein the matrix is based on a metal or alloy.

23. The shaped article of claim 22, wherein the matrix is based on aluminium or an aluminium alloy.

24. The shaped article of claim 1, wherein the reinforcing bodies are selected from the group consisting of bars, cables, wires and plates.

25. The shaped article of claim 1, wherein the reinforcing bodies comprise steel bodies.

26. The shaped article of claim 25, wherein the reinforcing bodies exhibit at least one of the following characteristics:

(a) a tensile strength of at least about 1000 MPa; and (b) an ultimate strain of at least about 10%.

27. The shaped article of claim 1, wherein the reinforcing bodies exhibit at least one of the following characteristics:

(a) a tensile strength of at least about 700 MPa; and (b) an ultimate strain of at least about 6%.

28. The shaped article of claim 1, wherein the matrix exhibits at least one of the following characteristics:

(a) a compressive strength of at least about 150 MPa;

(b)) a modulus of elasticity of at least about 80 GPa; and (c) a fracture energy of at least about 2 kN/m.

29. The shaped article of claim 1, wherein the matrix exhibits at least one of the following characteristics:

(a) a compressive strength of at least about 200 MPa;

(b) a modulus of elasticity of at least about 100 GPa; and (c) a fracture energy of at least about 5 kN/m.

30. The shaped article of claim 1, wherein the volume proportion of the reinforcing bodies in the domain which has the reinforced composite structure is at least about 10% and the volume proportion of the reinforcing bodies in any specific direction of the domain is at least about 5%.

* * * * *

UNITED STATES PATENT AND TRADEMARK OFFICE
CERTIFICATE OF CORRECTION

PATENT NO. : 6,358,603 B1　　　　　　　　　　　　　　　　　　　　Page 1 of 1
DATED : March 19, 2002
INVENTOR(S) : Bache It is certified that error appears in the above-identified patent and that said Letters Patent is hereby corrected as shown below:

<u>Title page,</u>
Insert:
-- [30] Foreign Application Priority Data
January 13, 1997　　　Denmark　　　0043/97 --

Signed and Sealed this

Twenty-fifth Day of February, 2003

JAMES E. ROGAN
*Director of the United States Patent and Trademark Office*